Figure 12:
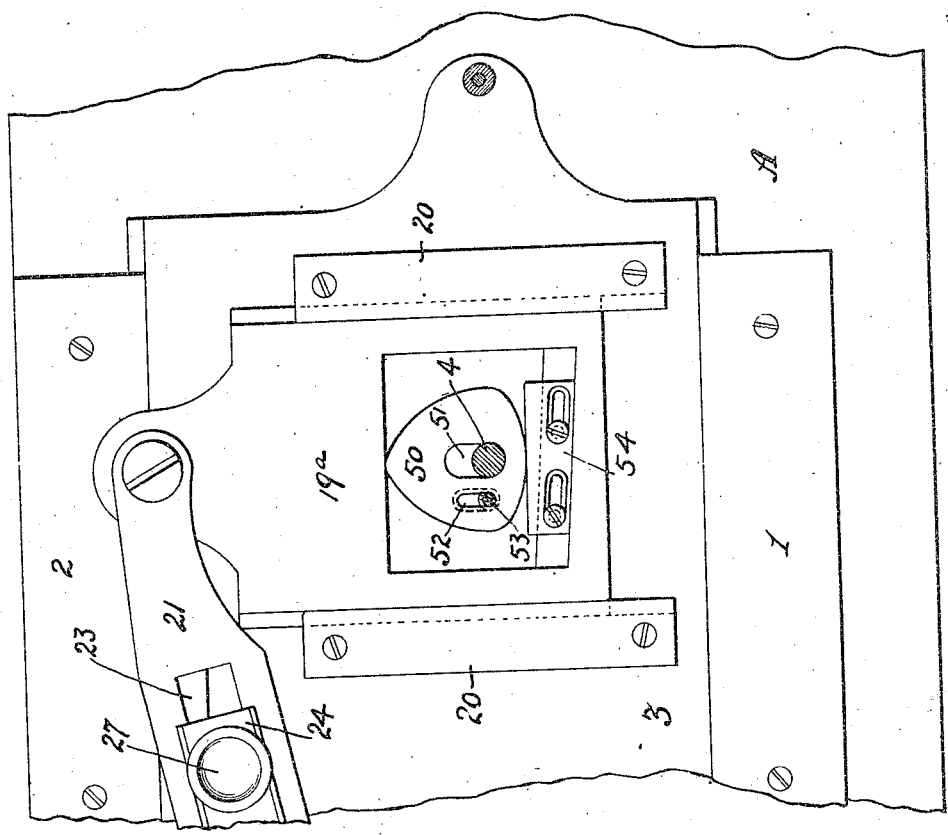

No. 648,991. Patented May 8, 1900.
W. N. PARKES.
BUTTONHOLE SEWING MACHINE.
(Application filed Dec. 14, 1897.)
(No Model.) 7 Sheets—Sheet 1.
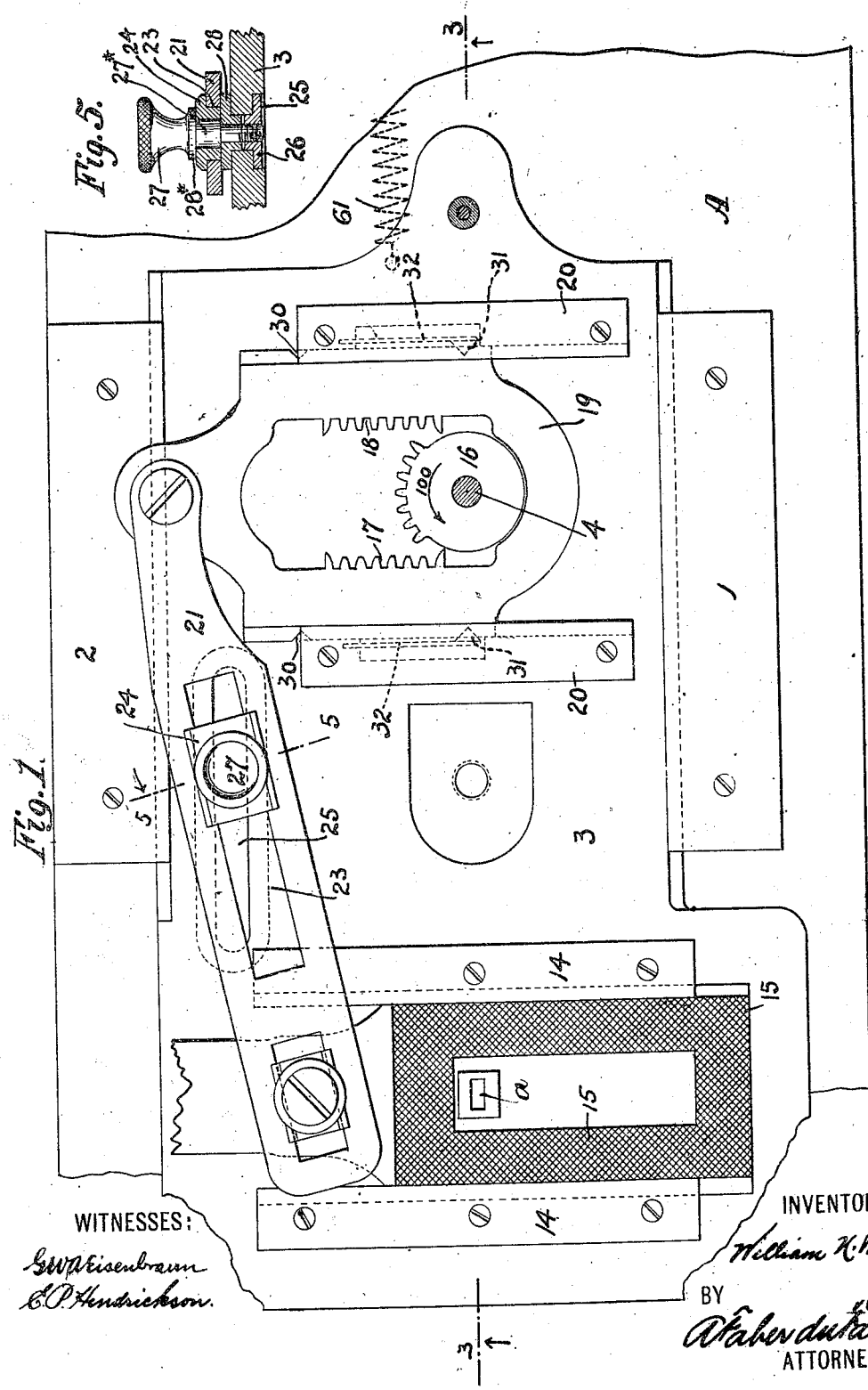

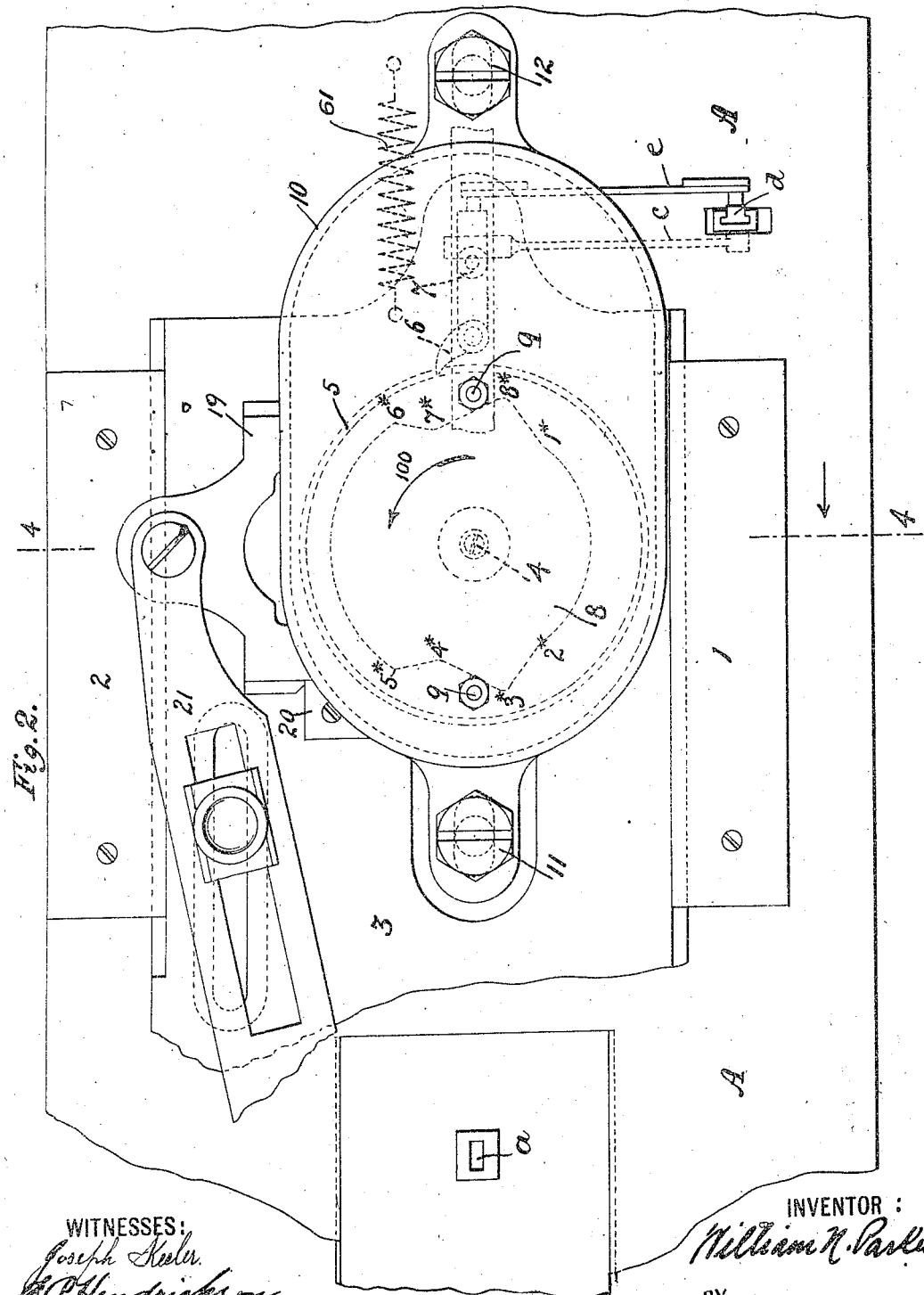

No. 648,991. Patented May 8, 1900.
W. N. PARKES.
BUTTONHOLE SEWING MACHINE.
(Application filed Dec. 14, 1897.)
(No Model.) 7 Sheets—Sheet 3.
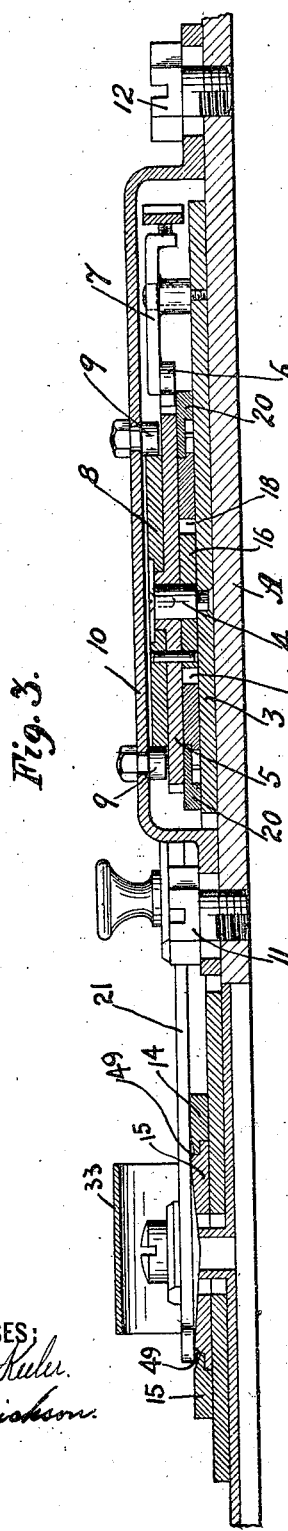
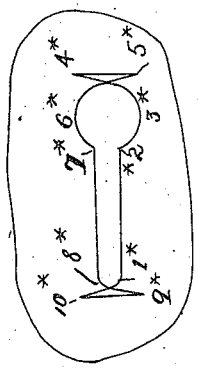
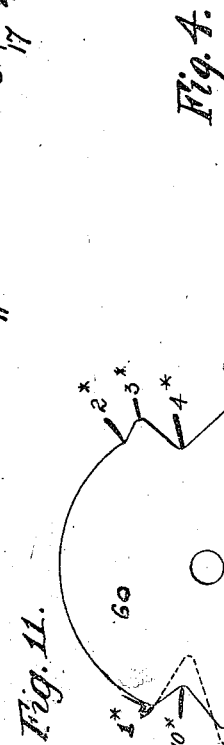
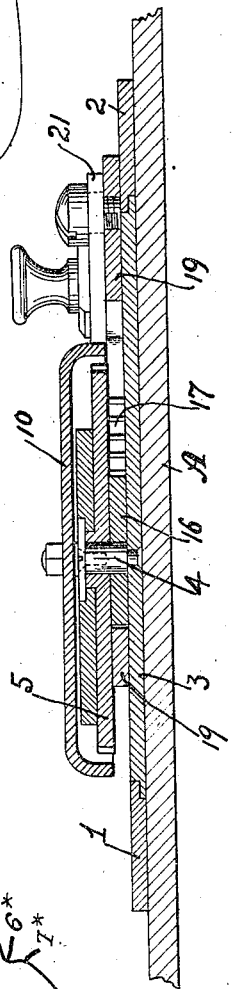
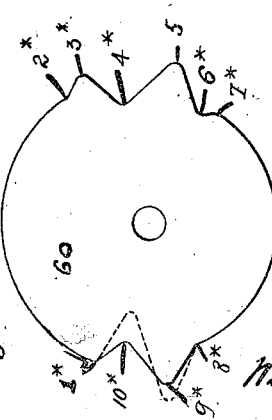
WITNESSES;
Joseph Keeler.
E. P. Hendrickson.
INVENTOR:
William N. Parkes
BY
A. Faber du Faur
ATTORNEY No. 648,991.  
W. N. PARKES.  
BUTTONHOLE SEWING MACHINE.  
(Application filed Dec. 14, 1897.)  
Patented May 8, 1900.  
(No Model.)  
7 Sheets—Sheet 4.

WITNESSES:  
Chas. W. Thomas.  
E. P. Hendrickson.

INVENTOR:  
William N. Parkes  
BY  
A. Faber du Faur  
ATTORNEY.

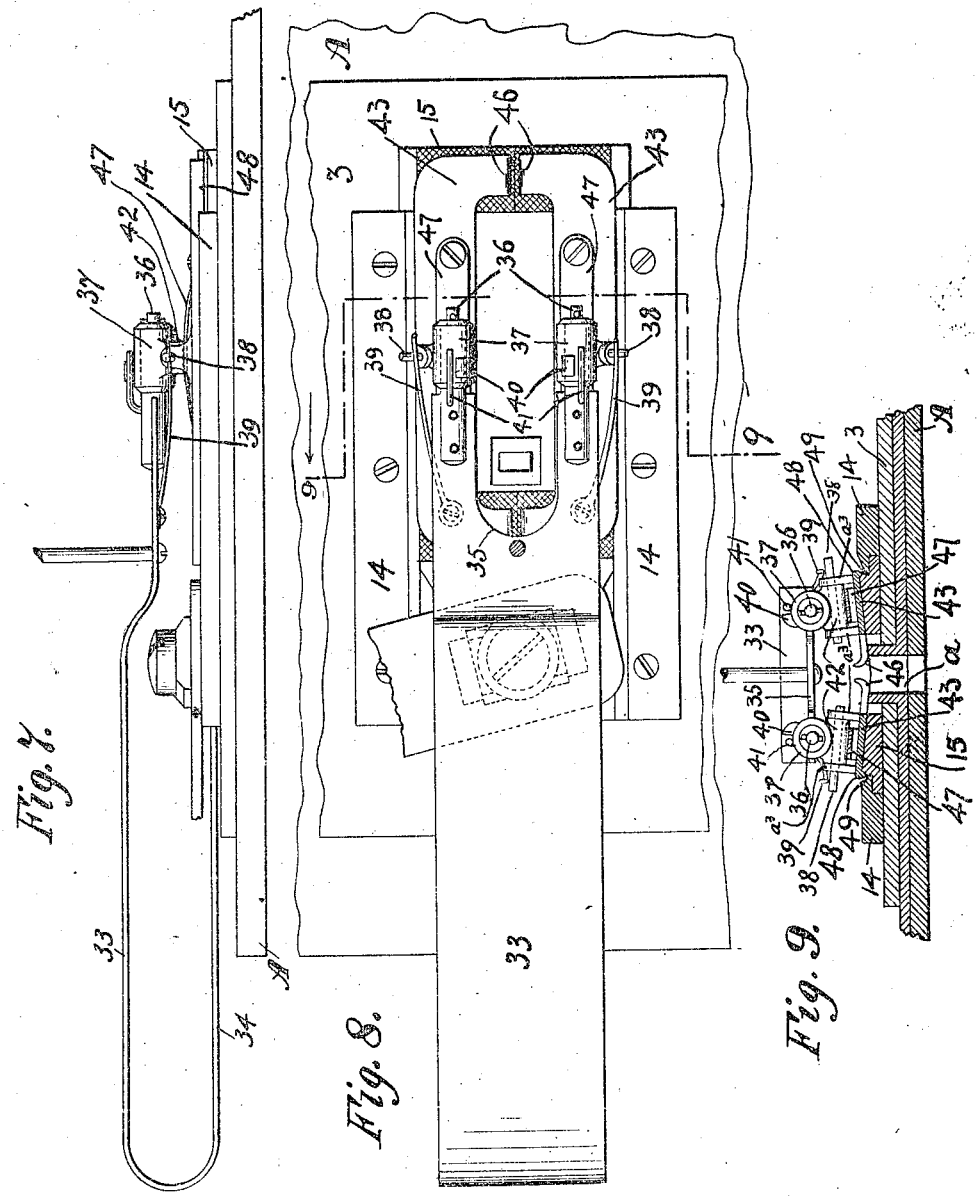

No. 648,991. Patented May 8, 1900.
W. N. PARKES.
BUTTONHOLE SEWING MACHINE.
(Application filed Dec. 14, 1897.)
(No Model.) 7 Sheets—Sheet 6.

Witnesses:
J. B. McGirr,
L. P. Hendrickson.

Inventor.
William N. Parkes,
by Maher du Pauf
Atty.

No. 648,991. Patented May 8, 1900.
W. N. PARKES.
BUTTONHOLE SEWING MACHINE.
(Application filed Dec. 14, 1897.)
(No Model.) 7 Sheets—Sheet 7.
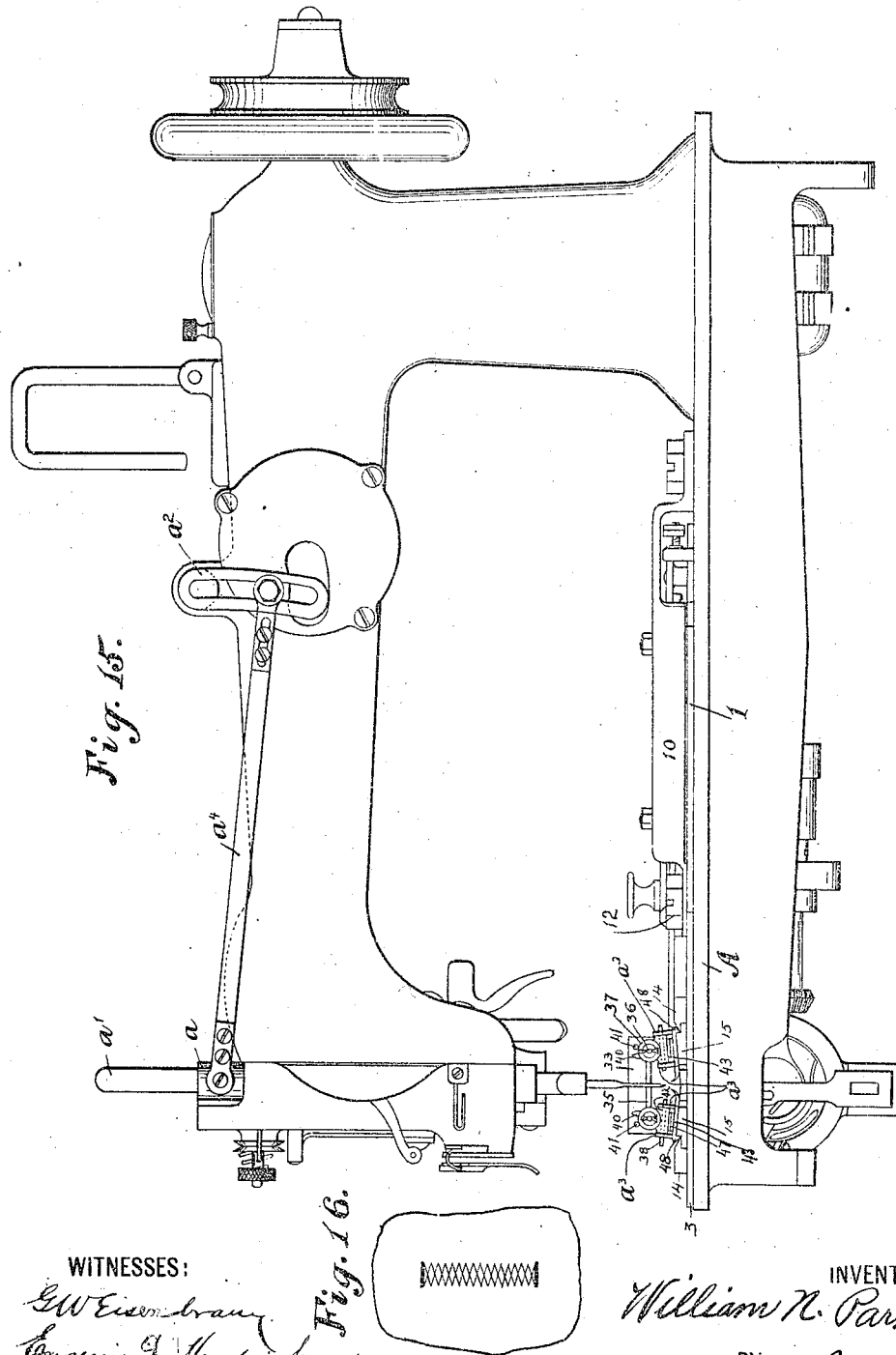
WITNESSES: INVENTOR.

UNITED STATES PATENT OFFICE.

WILLIAM N. PARKES, OF NEW YORK, N. Y.

BUTTONHOLE-SEWING MACHINE.

SPECIFICATION forming part of Letters Patent No. 648,991, dated May 8, 1900.

Application filed December 14, 1897. Serial No. 661,893. (No model.)

*To all whom it may concern:*

Be it known that I, WILLIAM N. PARKES, a citizen of the United States of America, and a resident of New York, (Brooklyn,) in the county of Kings and State of New York, have invented a certain new and useful Improvement in Buttonhole-Sewing Machines, of which the following is a specification.

My invention has special reference to that class of sewing-machines known as "zigzag" or "overseaming" machines, but is not confined exclusively to this class. It also has reference to any class of sewing-machines having a stitch-forming mechanism adapted to stitch the edges of buttonholes.

It has for its main object to provide a simple mechanism for presenting or feeding the work to the needle in this class of machines so as to produce buttonholes and tacks.

It also has for its objects, first, to feed the work uniformly step by step during the stitching of the sides of the buttonhole until near the end and then, in combination with this movement, to feed the work laterally step by step, thereby forming curved lines of stitches across the end of the buttonhole; secondly, to provide for a "dwell" in the movement longitudinally of the buttonhole when at or near the ends of the same and to continue the step-by-step lateral movement, thereby forming one or more straight lines of stitches across the end of the buttonhole in combination with the curved lines or separately; thirdly, a convenient attachment specially adapted to be affixed to zigzag-sewing machines for thus converting the same into buttonhole-sewing machines, and, fourthly, to put the mechanism in such form that it can be readily applied as an attachment to and removed from zigzag-sewing machines without interfering with the zigzag or overseaming properties of such machines.

In a buttonhole formed by mechanism the stitches are distributed, as previously pointed out, first in a curved line of step-by-step lateral stitches, then in a straight line, and then in another curved line intersecting the first curved line. I find that this makes a very strong and finely-finished end, and as the straight line of lateral stitching is across the extreme end of the buttonhole it gives the end a square appearance. Of course the ends can be made to have the round appearance by continuing the longitudinal movement of the work-carrier during the lateral movement of the same. At the ends of the buttonhole the relative movements longitudinally and laterally may be so regulated as to form an eyelet end.

The nature of my invention will best be understood when described in connection with the accompanying drawings, in which—

Figure 6:
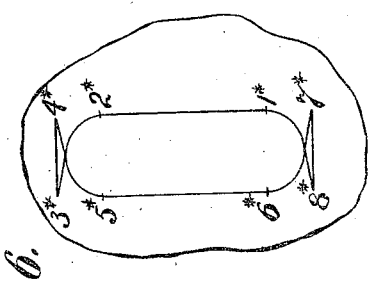
Figure 13:
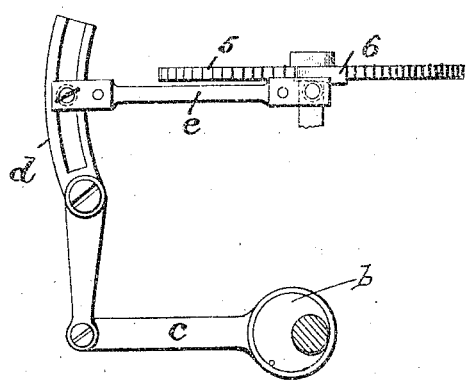
Figure 14:
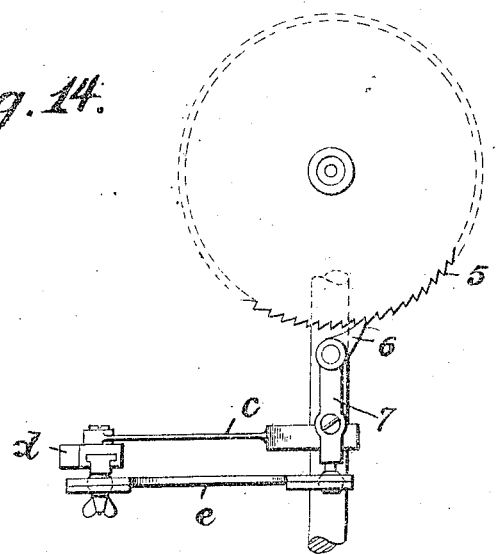

Figure 1 represents a plan view of my improved mechanism with part removed. Fig. 2 is a top view of the mechanism, the work-clamp being removed and connections with the same being broken away. Fig. 3 is a vertical section on the line 3 3, Fig. 1, with parts removed from Fig. 1 replaced, thus showing a complete section of the mechanism. Fig. 4 is a cross-section on the line 4 4, Fig. 2. Fig. 5 is a section on the line 5 5, Fig. 1, illustrating a detail part. Fig. 6 is a diagrammatic view of a buttonhole. Fig. 7 is a side elevation of the work-carrier. Fig. 8 is a top view of the same. Fig. 9 is a vertical section on the line 9 9, Fig. 8. Fig. 10 is a diagrammatic view of an eyelet-end buttonhole. Fig. 11 is a face view of a cam forming part of the mechanism for the formation of the buttonhole shown in Fig. 10. Fig. 12 illustrates a modification of a part of the actuating mechanism. Fig. 13 illustrates the connection between the driving-cam and the pawl-lever looking from right to left, other parts being omitted. Fig. 14 illustrates a top view of the same. Fig. 15 is a front elevation of a machine with my mechanism attached thereto. Fig. 16 is a diagrammatic view of a square-end buttonhole.

Similar letters and numerals of reference designate corresponding parts throughout the several views of the drawings.

Referring to the drawings, the letter A designates the bed-plate of the machine; a, the usual swinging gate in which the needle-bar $a'$ is mounted; $a^2$, the usual segment-lever, which is vibrated in a usual manner through a usual switch-cam on the upper shaft of the machine, and $a^4$, a usual connection between the needle-bar gate and the segment-lever. With my mechanism any usual complemental stitch-forming mechanism can be used in connection with the above or any stitch-forming mechanism which has a reciprocating needle-bar which is vibrated laterally. On the top of said bed-plate are secured two guides 1 and 2, running longitudinally of said plate and receiving two opposite sides of a slide 3 and guiding the same transversely to the length of the buttonhole to be stitched, said slide extending outwardly, so as to cross the path of the needle, and having a suitable opening $a$ therein to allow for the vibratory action of the needle and the reciprocations of said slide 3. To the slide 3 are secured two guides 14, extending transversely to the same, and between these guides is mounted a slide 15, forming the lower member of the work-carrier. This slide 15 is mounted to reciprocate on the slide 3 across the path of the needle and at substantially right angles to the lateral vibrations of the same, a large enough longitudinal opening being made in said slide 15 to allow for the formation of buttonholes within the said opening. The upper surface of said slide 15 is roughened or toothed suitably for engagement with the work, and said surface is beveled or inclined downwardly toward the center of the slide. In the present example, Figs. 3, 7, 8, and 9, I have shown the work-carrier provided with an upper spring member 33 34, acting in conjunction with the lower member or slide 15 to carry the work along, said upper member holding the work down upon said slide or lower member. Said upper member 33 of the work-carrier is formed of a flat spring having a lower part 34, which is attached to the rear end of the lower member 15, while the body overhangs the said lower member. The free end of the member 33 is bifurcated or formed with an opening, as at 35, to allow the action of the needle in forming the buttonhole. To said bifurcated end are attached two studs 36, extending in the direction of the length of the member and upon which two sleeves 37 are mounted to turn freely. Said sleeves have lugs 42 formed on their under side, to which presser-plates 43 are hinged by means of the pins 38, passing through the upwardly-extending bearings $a^3$, formed on the plates 43, and the lugs 42 in a suitable manner to allow the bearings to turn freely on the pins, as shown in Fig. 9. The presser-plates 43 are substantially rectangular in shape, with inwardly-extending upturned ends 46, and have ledges 48 formed along their outer lower edges. The upper outer edges of the slide 15 are beveled, as at 49, to adapt it for engagement with the ledges on the presser-plates 43. A spring 39, attached to the member 33, normally presses downwardly on the extending ends of the pins 38, and thereby turns the sleeves (when the clamp is open) until the lips 40 on the sleeves come into contact with the stops 41, projecting from the studs 36. When in this position, the plates 43 are in substantially a horizontal position laterally, the upturned ends 46 serving to prevent overlapping of the plates. Any suitable means can be used for keeping the said plates in a horizontal position longitudinally when the clamp is open—such, for example, as the curved springs 47, which are attached to the presser-plates and impinge against the under side of the lugs 42. As the clamp is closed the ledges 48 on the plates 43 engage with the work and draw it over the beveled edges 49 of the lower slide 15, after which further movement of the clamp in closing turns the plates 43 on the hinge or pivot 36 and stretches the work across the opening in the said lower slide 15. The clamp can be opened by any suitable means—as, for example, those described in my prior application, Serial No. 610,810, filed November 2, 1896.

The work-carrier is reciprocated longitudinally—that is, transversely to the lateral vibrations of the needle—to stitch the sides of the buttonholes by the following mechanisms: On a stud 4, attached to the slide 3, is mounted to turn a mutilated gear 16, the teeth of which are adapted to engage alternately with the racks 17 and 18, formed on the inner sides of a slide 19, mounted in guides 20 on the slide 3 and extending transversely to the same. Mounted above the gear 16 on the stud 4 is a ratchet-wheel 5, having an upwardly-extending hub, on which a cam 8 is mounted. The said gear 16, ratchet-wheel 5, and cam 8 are all connected by any suitable means, and are thus adapted to be driven simultaneously. The ratchet-wheel 5 is rotated by a feed-pawl 6, carried by a feed-lever 7, which lever may be vibrated from any suitable moving part of the machine—for instance, from the main shaft of the machine—by an eccentric or cam $b$, a connecting-rod $c$, a lever $d$, and a link $e$, as indicated in Fig. 2 and also illustrated in Figs. 13 and 14. The inner end of the slide 19 is placed in connection with the slide 15 by a lever 21, having an adjustable fulcrum 22. This fulcrum is adjustably secured to the slide 3, as shown in Fig. 5, in the following manner: In the lever 21 is formed a longitudinal slot 23, into which is fitted a shoe 24, adapted to slide in said slot. On the under side of the slide 3 is formed a slot 25, countersunk in a usual manner. In said slot is placed a nut 26, which is engaged by the lower end of a screw-stud 27, passing through the shoe 24 and through a shoe 28, fitted into the slot 25 from above. The stud 27 is formed with a shoulder 28*, which keeps the shoe 24 in place, and with a hub 27*, which bears upon the shoe 28. When the screw-stud is drawn up, the nut and shoe 28 are drawn toward each other to clamp the stud to the slide 3, while the shoe 24 remains loose and turns with the lever 21.

The sides of the slide 19 are provided with notches 30 and 31, adapted to be engaged by spring-detents 32, which counteract any tendency of the slide 19 to shift while the teeth on the mutilated gear or sector 16 are passing from one rack to the other.

The means for reciprocating the slide 3 laterally for forming the tacks at the end of the buttonholes and moving the work so as to stitch from one side of the hole to the other by the combined movements of the work-carrier are constructed as follows: On the upwardly-extending hub of the ratchet-wheel 5 is secured a cam 8, which is engaged on opposite sides by roller-studs 9, carried by a cover 10, adjustably secured to the bed-plate A by screws 11 and 12 passing through slots in said cover and entering the bed-plate. When the ratchet-wheel 5 is turned, the slide 3 is reciprocated by the action of the cam 8 on the roller-studs 9, since the cover 10 is rigidly held by the screws 11 and 12.

In the example illustrated in Fig. 12 I have shown a modification of a part of the driving mechanism in which a cam is used in place of the racks and mutilated gear 16 for imparting reciprocating motion to a slide 19ᵃ, which is placed in connection with the work-carrier through the lever 21 and connections, before described. The said slide 19ᵃ reciprocates in the same bearing as the rack 19, heretofore described. The cam 50 is provided with a slot 51, through which the stud 4 passes, and with a second parallel slot 52, through which is passed a set-screw 53, which is screwed into the ratchet-wheel 5, located directly above the same, and so fastens the cam to the ratchet-wheel to participate in its rotation. The cam engages with the slide 19 or, preferably, with an inserted adjusting-block 54, secured to one side of the same, and in its rotation imparts reciprocating motion to said slide. The slots 51 and 52 and the set-screw 53 are for the purpose of adjusting the cam to vary the length of the stroke of the slide 19, and consequently that of the work-carrier and the buttonhole. By shifting the fulcrum of lever 21 this adjustment can be further varied so as to still further decrease or increase the stroke of the work-carrier.

To illustrate the operation of the machine in automatically stitching buttonholes, let it be assumed that the buttonhole is started at the point marked 1* in Fig. 6. The corresponding position of the cam 8, Fig. 2, is that with the point 1* in contact with the roller-stud 9 to the right of the cam and in contact with the other roller-stud at point 5*. As the cam turns in the direction of arrow 100, Fig. 2, the slide 3 remains stationary, and one side of the buttonhole is stitched in view of the work-carrier being moved toward the operator by gear 16 engaging with rack 18, Fig. 1, of slide 19. During the travel of the cam from 2* to 3* the slide 3 is moved to the right, while the gear 16 is still moving the work-carrier toward the operator, thus forming a curved line of stitching 2* 3* at the end of the buttonhole. When the cam is at 3*, gear 16 has just become disengaged from rack 18 of slide 19 and the feed action ceases. On the continued rotation of cam 8 to point 4* a lateral line of stitching 3* 4* is formed square across the end of the buttonhole, since the slide 3 is being moved to the left by the cam. Gear 16 is now in position to engage with rack 17 of slide 19 to move the work-carrier from the operator, and on continued rotation of the cam from 4* to 5* a curved line of stitching 4* 5*, crossing the first curved line of stitching, is formed, since the slide 3 is now being moved to the right. When the cam travels from 5* to 6*, the second side 5* 6* of the buttonhole is stitched, since the slide 3 remains stationary again, and the work-carrier is moved from the operator by the action of gear 16 on rack 17. The second end of the buttonhole is stitched in like manner by the portions 6* to 1* of the cam in connection with the action of the gear 16 on racks 17 and 18. The buttonhole thus produced is therefore provided with reinforced ends having square extremes and curved interior ends.

If the longitudinal movement of the work-carrier is arrested when the work is under the needle at the point marked 2* in Fig. 6 and remains at rest until the point 5* is reached and the lateral movement of the work-carrier effected at the same time by the movement of the cam 8, a straight-end buttonhole will be produced, substantially in outline like the one shown in Fig. 16. In the present example of my invention the needle continues to vibrate, the same as during the stitching of the sides of the holes, as the work is shifted laterally to form the ends of the same, which of course forms a series of tacking or barring stitches at the ends. These stitches in the example just cited would of course all be in a straight li across the ends of the holes, and the result would be a square-end buttonhole, as above indicated, the number of times the end is crossed being determined by the shape of the cam 8. The longitudinal movement of the work-carrier may be arrested by discontinuing the engagement of gear 16 with the racks 17 and 18 before or at the time the lateral movement of the work-carrier commences—for instance, by shortening the racks or by decreasing the number of teeth in the gear.

In Fig. 10 I have shown an eyelet-end buttonhole and in Fig. 11 a cam for effecting the necessary lateral movements of the work-carrier. The second end of the buttonhole is shown to be similar to that previously described in connection with Fig. 6, and for this reason but one wedge-shaped stud placed to the right in Figs. 2 and 3 is used, and the cam 60 is drawn against the same by a spring 61, attached to the slide 3 and to the bed-plate A, the said spring passing through an opening formed in the end of the cover 10. Spring 61 is indicated by broken lines in Figs. 1 and 2. The operations of the slide 3 and the slide 19 in producing the requisite lateral and longitudinal movements of the work-carrier are substantially the same as before. While the cam 60, Fig. 11, turns from 1* to 2* the work-carrier is moved longitudinally by the movement of slide 19 to stitch one side of the buttonhole. During the rotation of the cam from 2* to 3* and from 3* to 4* the curved portion 2* 3* 4* is formed at the end of the buttonhole, as the slide 3 is now reciprocated by the cam to move the work-carrier laterally while it is being moved longitudinally by the movement of slide 19. While the cam turns from 4* to 5* the straight line of stitching 4* to 5* at the end of the buttonhole is produced, as the work-carrier is moved only laterally in view of gear 16 being out of engagement with the slide 19. The parts of the cam numbered 5* 6* 7* cause the second curved line 5* 6* 7*, intersecting the line 2* 3* 4*, to be formed, as the longitudinal movement of the work-carrier is now taking place. During the rotation of the cam from 7* to 8* only longitudinal motion of the work-carrier takes place and the second side 7* to 8* of the buttonhole is stitched. The second end of the buttonhole is then stitched by the portions 8* 9* 10* of the cam, as before described in connection with Fig. 6. If the tack or bar at the second end of the buttonhole is to be made longer, the portions 8* 9* 10* 1* are shaped as indicated by broken lines in Fig. 11.

If desired, a presser-foot can be used for holding the work down on the lower member 15 of the work-carrier in place of the upper member hereinbefore described. In this case the lower member by its engagement with the work feeds the same along, while the presser-foot, being stationary and smooth at its contact-surface, permits the work to slide as in ordinary machines.

It is evident that the mechanism for actuating the work-carrier, as described, instead of being attached directly to the bed-plate A of the machine could be attached in like manner to an auxiliary plate or base, which latter would then be attached to the bed of the machine. This construction puts the mechanism in a convenient form for its attachment to and removal from an ordinary zigzag or overseaming machine.

What I claim as new is—

1. The combination with a sewing-machine having a vertically-reciprocating and laterally-vibrating needle and complemental stitch-forming mechanism, of a toothed rack, a disk, a segment of teeth formed on the disk adapted to reciprocate the toothed rack and means for actuating the said disk, a work-carrier, and means in combination with the work-carrier and the rack, whereby when the rack is reciprocated the work-carrier is reciprocated, substantially as described.

2. The combination with a buttonhole-sewing machine having a vertically-reciprocating and laterally-vibrating needle and complemental stitch-forming mechanism, of a work-carrier mounted to reciprocate at substantially right angles to the lateral vibrations of the needle, a lever having one end connected with said work-carrier, a toothed rack mounted to slide placed in operative connection with the other end of the said lever, and means for reciprocating the said rack, substantially as described.

3. The combination with a buttonhole-sewing machine having a vertically-reciprocating and laterally-vibrating needle and complemental stitch-forming mechanism, of a slide adapted to reciprocate, a toothed rack mounted to reciprocate in a fixed guideway on the said slide, a mutilated gear mounted on a fixed bearing on the said slide adapted to engage the said rack, a work-carrier mounted to reciprocate on the said slide, an operative connection between the said work-carrier and the said rack, whereby when the rack is reciprocated the work-carrier is reciprocated, means adapted to actuate the mutilated gear, and means adapted to reciprocate the slide when stitching at or near the ends of the buttonholes only, substantially as described.

4. In a sewing-machine having a vertically-reciprocating and laterally-vibrating needle, the combination of a work-carrier mounted to reciprocate at substantially right angles to the lateral vibrations of the needle, a lever having one end connected with said work-carrier, a toothed rack mounted to slide and placed in operative connection with the other end of said lever, a gear mounted to actuate said rack, and means for actuating said gear, substantially as described.

5. In a sewing-machine having a vertically-reciprocating and laterally-vibrating needle, the combination of a slide mounted to reciprocate, a work-carrier mounted on said slide to reciprocate at substantially right angles to the reciprocations of said slide, an internally-toothed rack mounted to reciprocate on said slide, a lever having one end connected with the work-carrier and the other end with the internally-toothed rack, a mutilated gear mounted to alternately engage with the internally-toothed rack, a feed-wheel mounted to actuate said gear, a feed-pawl mounted to engage with said feed-wheel, an eccentric or cam actuated by the main shaft of the machine, and an operative connection between said eccentric or cam and aforesaid pawl for actuating the pawl when the eccentric or cam is actuated, substantially as described.

6. In a sewing-machine having a vertically-reciprocating and laterally-vibrating needle, the combination of a slide mounted to reciprocate, a work-carrier mounted on said slide to reciprocate at substantially right angles to the reciprocations of said slide, a ratchet feed-wheel mounted on said slide, mechanism for rotating the same, a cam carried by said ratchet-wheel and engaging with a fixed stud or studs, a mutilated gear rotating with said ratchet feed-wheel, a second slide mounted to reciprocate on the first slide and provided with oppositely-placed toothed racks adapted to be alternately engaged by said mutilated gear, and a lever connecting said second slide and the work-carrier, substantially as described.

7. In a sewing-machine having a vertically-reciprocating and laterally-vibrating needle, the combination of a slide mounted to reciprocate, a work-carrier mounted on said slide to reciprocate at substantially right angles to the reciprocations of said slide, a ratchet feed-wheel mounted on said slide, mechanism for rotating the same, a cam carried by said ratchet-wheel and engaging with a fixed stud or studs, a mutilated gear rotating with said ratchet feed-wheel, a second slide mounted to reciprocate on the first slide and provided with oppositely-placed toothed racks adapted to be alternately engaged by said mutilated gear, a detent or detents adapted to engage with the said second slide, and a lever connecting said second slide and the work-carrier, substantially as described.

8. In a sewing-machine having a vertically-reciprocating and laterally-vibrating needle, the combination of a slide mounted to reciprocate, a work-carrier mounted to reciprocate on said slide, mechanism for actuating the work-carrier and a cam also mounted on said slide, a fixed cover projecting over said mechanism, a roller stud or studs projecting downwardly from said cover and engaged by the cam, and means for actuating aforesaid mechanism, substantially as described.

9. The combination in a work-carrier, of two sleeves 37 mounted to turn on the upper member of said work-carrier, two presser-plates 43 provided with inwardly and upwardly turned ends and hinged to said sleeves and therefore capable of turning longitudinally and laterally, springs 47 placed between said presser-plates and the hinges, spring 39 acting upon said sleeves to normally hold the presser-plates in substantially-horizontal positions, ledges 48 formed on the lower outer edges of said presser-plates, and a lower member 15 provided with an inclined face and adapted to be engaged by the ledges on the presser-plates for turning the same downwardly when the upper member is depressed, substantially as described.

10. The combination in a buttonhole-sewing machine of a work-carrier, mechanism for moving said work-carrier laterally to stitch or tack the ends of the buttonholes and after stitching one side of the buttonhole to move the work-clamp laterally in a position to stitch the other side thereof, embodying a cam having the smooth portions 1* 2* and 5* 6*, and the inclined portions 2* 3* 4* 5*, and mechanism for reciprocating said work-carrier longitudinally to stitch the sides of the buttonholes, substantially as described.

11. The combination in a buttonhole-sewing machine of a work-carrier, mechanism for moving said work-carrier laterally to stitch or tack the ends of the buttonholes and after stitching one side of the buttonhole to move the work-clamp laterally in a position to stitch the other side thereof, embodying a cam having the smooth portions 1* 2* and 5* 6*; the inclined portions 2* 3* 4* 5* on one side and the inclined portions 6* 7* 8* 1* on the opposite side, and mechanism for reciprocating said work-carrier longitudinally to stitch the sides of the buttonholes, substantially as described.

In testimony that I claim the foregoing as my invention I have signed my name, in presence of two witnesses, this 14th day of October, 1897.

W. N. PARKES.

Witnesses:
EUGENIE A. PERSIDES,
A. FABER DU FAUR, Jr.